C. L. LAWTON.
TESTING DEVICE FOR GOLF CLUBS.
APPLICATION FILED MAR. 22, 1920.
1,351,768.
Patented Sept. 7, 1920.
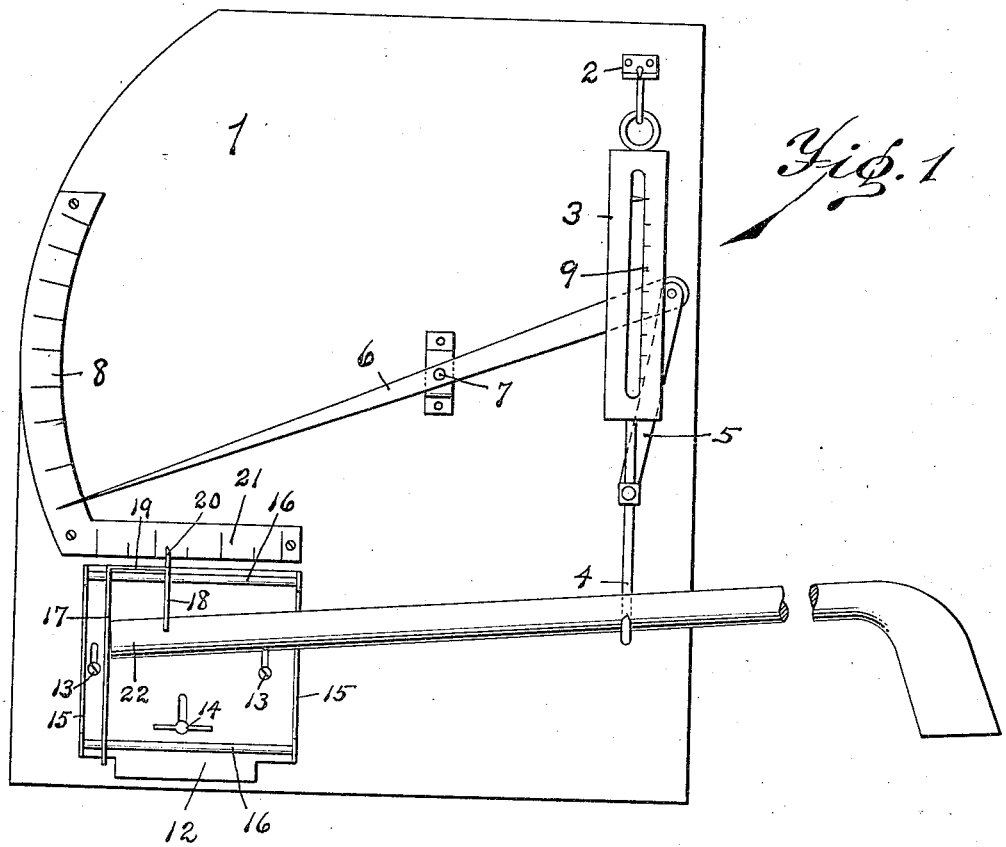
Fig. 1
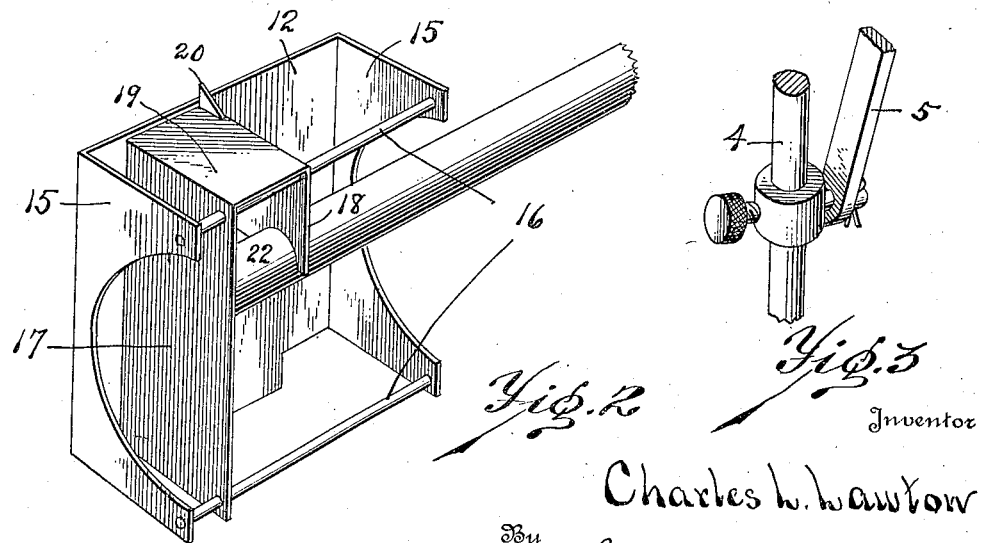
Fig. 2
Fig. 3
Inventor
Charles W. Lawton
By Edward N. Pagelsen
Attorney

UNITED STATES PATENT OFFICE.

CHARLES L. LAWTON, OF HANCOCK, MICHIGAN.

TESTING DEVICE FOR GOLF-CLUBS.

1,351,768.  Specification of Letters Patent.  Patented Sept. 7, 1920.

Application filed March 22, 1920. Serial No. 367,675.

*To all whom it may concern:*

Be it known that I, CHARLES L. LAWTON, a citizen of the United States, and residing at Hancock, in the county of Houghton and State of Michigan, have invented a new and Improved Testing Device for Golf-Clubs, of which the following is a specification.

This invention relates to means for determining the proper weight of the head of each golf club of a set to obtain its comparative moment of inertia and thus secure a set of which each club shall have the proper "hang" and "feel."

This invention consists of a weight resisting mechanism adapted to support a golf club near its handle and an indicator connected to said mechanism, means to position the shaft of the club, an abutment to hold down the handle end of the club, and means on which the abutment is slidably mounted, said means embodying an indicator which is graduated so that the abutment may be moved toward and from the weight resisting mechanism so as to be a distance therefrom equal to the distance between the wrists of the person who is to use the club when holding the club in playing position.

It further consists in the details of construction illustrated in the accompanying drawing and particularly pointed out in the claims.

In the accompanying drawing, Figure 1 is an elevation of this improved weight determining device. Fig. 2 is a perspective view of the movable abutment. Fig. 3 is a detail of the connection between the indicator and the weight resisting mechanism.

Similar reference characters refer to like parts throughout the several views.

On a plate or frame 1 is mounted a bracket 2 on which is supported a load resisting device 3, preferably an ordinary spring scale. Its load supporting hook 4 is shown connected to a link 5 and this to one end of a pointer 6, pivoted at 7 and moving over the scale 8. This pointer and scale may be omitted if desired but the graduations of the scale 9 of the spring scale 3 may be inconvenient to read on so the pointer and scale 8 are desirable.

Vertically slidable on the frame 1 is a bracket consisting of a back 12 which is secured to the frame by screws 13 and 14 so that it may be raised and lowered. The sides 15 of this bracket support the rods 16 on which an abutment is slidable which consists of the vertical stop-plate 17, the hook 18, and the top-plate 19 provided with a pointer 20 which moves over the scale 21.

When a set of golf clubs is to be tested, the pointer 20 is moved so that the distance between it and the hook 4 will be the normal distance between the wrists of the person who is to use the club. The standard or favorite club is then placed on this hook 4 with its handle 22 against the stop plate 17 and under the abutment 18. The pointer 6 will then be moved a distance which depends upon the moment of inertia of the club and after this reading has been taken, it is a simple matter to so increase or decrease the weights of the heads of the other clubs of a set to bring them to the same "feel" or "hang."

The details and proportions of the various parts of this device may all be changed without departing from the spirit of my invention as set forth in the following claims.

I claim:—

1. In a device for determining the moment of inertia of golf clubs, the combination of a load resisting device for supporting the clubs near their handle ends, an abutment movable toward and from the load resisting device and adapted to prevent the upward movement of said handle ends, and means to indicate the load resisted.

2. In a device for determining the moment of inertia of golf clubs, the combination of a load resisting device for supporting the clubs near their handle ends, an abutment movable toward and from the load resisting device and adapted to prevent the upward movement of said handle ends, means to indicate the load resisted comprising a scale and a pointer pivoted adjacent thereto and adapted to swing over said scale, and means to connect the pointer to the load resisting device.

3. In a device for determining characteristics of golf clubs, the combination of a spring scale and means connected thereto to receive the weight of a club, a stop movable toward and from the spring scale to determine the distance from the handle end at which said spring scale may engage the club, and an abutment connected to said stop comprising a plate under which the end of the club extends and which constitutes a fulcrum of a lever of which the weight end is the head of the club.

4. In a device for determining characteristics of golf clubs, the combination of a spring scale and means connected thereto to receive the weight of a club, a stop movable toward and from the spring scale to determine the distance from the handle end at which said spring scale may engage the club, an abutment connected to said stop comprising a plate under which the end of the club extends and which constitutes a fulcrum of a lever of which the weight end is the head of the club, and a vertically adjustable bracket on which the stop and abutment are slidably mounted.

CHARLES L. LAWTON.